United States Patent
Sugino et al.

(10) Patent No.: US 11,491,525 B2
(45) Date of Patent: Nov. 8, 2022

(54) ALUMINUM ALLOY COMPONENT

(71) Applicant: Kobe Steel, Ltd., Kobe (JP)

(72) Inventors: Koki Sugino, Kobe (JP); Masatoshi Yoshida, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 343 days.

(21) Appl. No.: 16/804,687

(22) Filed: Feb. 28, 2020

(65) Prior Publication Data

US 2020/0276628 A1 Sep. 3, 2020

(30) Foreign Application Priority Data

Mar. 1, 2019 (JP) .............................. JP2019-037663

(51) Int. Cl.
| | | |
|---|---|---|
| B32B 15/01 | (2006.01) | |
| B21D 7/00 | (2006.01) | |
| B21D 7/08 | (2006.01) | |
| B61F 5/52 | (2006.01) | |
| B65B 59/00 | (2006.01) | |
| B32B 27/08 | (2006.01) | |

(52) U.S. Cl.
CPC .............. B21D 7/00 (2013.01); B21D 7/08 (2013.01); *B32B 27/08* (2013.01); *B61F 5/52* (2013.01); *B65B 59/001* (2019.05)

(58) Field of Classification Search
CPC ..... B65B 59/001; B32B 27/08; F16B 39/284; E04C 3/07; E04C 3/083; E04C 3/11; B61F 5/52; E06B 3/485; B21D 7/08; B21D 7/00
See application file for complete search history.

(56) References Cited

U.S. PATENT DOCUMENTS

| | | | | |
|---|---|---|---|---|
| 2,742,939 A | * | 4/1956 | Larson | F16B 39/284 |
| | | | | 411/277 |
| 3,648,755 A | * | 3/1972 | Thiele | E06B 3/485 |
| | | | | 160/40 |
| 4,545,170 A | * | 10/1985 | Shirey | E04C 3/083 |
| | | | | 428/595 |
| 5,253,501 A | * | 10/1993 | Spath | B21D 7/08 |
| | | | | 72/224 |

(Continued)

FOREIGN PATENT DOCUMENTS

| | | |
|---|---|---|
| JP | 7-227618 A | 8/1995 |
| JP | 8-170139 A | 7/1996 |

(Continued)

OTHER PUBLICATIONS

Extended European Search Report dated May 20, 2020 in Patent Application No. 20157982.8, 9 pages.

*Primary Examiner* — Tuan A Vu
(74) *Attorney, Agent, or Firm* — Oblon, McClelland, Maier & Neustadt, L.L.P.

(57) ABSTRACT

To suppress occurrence of stress corrosion cracking in a weld due to tensile residual stress generated in a web or a middle rib in case of bend forming of an aluminum alloy extrusion having the weld on the web or/and the middle rib. In bend forming of the aluminum alloy extrusion, a peak position of tensile residual stress generated in the middle rib exists in a region other than the vicinity of the weld. Since the peak position is away from the weld by a distance, tensile residual stress in the weld is reduced, making it possible to suppress occurrence of stress corrosion cracking.

9 Claims, 3 Drawing Sheets

(56) References Cited

U.S. PATENT DOCUMENTS

| | | | | |
|---|---|---|---|---|
| 5,535,569 | A | * | 7/1996 | Seccombe .................. E04C 3/11 52/634 |
| 2003/0017302 | A1 | * | 1/2003 | Drozd ..................... B32B 27/08 428/457 |
| 2004/0084119 | A1 | | 5/2004 | Sano et al. |
| 2009/0007520 | A1 | * | 1/2009 | Navon ...................... E04C 3/07 52/837 |
| 2017/0349312 | A1 | * | 12/2017 | Lazor ................... B65B 59/001 |
| 2018/0029616 | A1 | * | 2/2018 | Hubmann ................. B61F 5/52 |
| 2018/0043910 | A1 | * | 2/2018 | Hubmann ................. B61F 5/52 |
| 2019/0152304 | A1 | | 5/2019 | Yoshida et al. |

FOREIGN PATENT DOCUMENTS

| | | | |
|---|---|---|---|
| JP | 10-306338 | A | 11/1998 |
| JP | 2001-71025 | A | 3/2001 |
| JP | 2004-149907 | A | 5/2004 |
| JP | 2016-112603 | A | 6/2016 |
| JP | 6322329 | B1 | 5/2018 |
| JP | 6452878 | B1 | 1/2019 |

* cited by examiner

ALUMINUM ALLOY COMPONENT

BACKGROUND

The present invention relates to aluminum alloy components such as bumper reinforces or door beams produced by bend forming of an aluminum alloy extrusion having a hollow section.

The aluminum alloy extrusion having the hollow section is lightweight and has high energy absorption, and is thus widely used as a material for automotive components, such as bumper reinforces, door beams, frame members, requiring weight saving and energy absorption.

When an automotive component is manufactured from an aluminum alloy extrusion, the aluminum alloy extrusion may be subjected to bend forming in light of body design. Such bend forming is typically performed with a comparatively large curvature, and simple bending may be difficult due to springback occurring in an elastic deformation range. In such a case, stretch bend forming is used to suppress the springback.

When the aluminum alloy extrusion is subjected to bend forming (including stretch bend forming), residual stress is generated in a cross section of the extrusion due to the springback. Tensile residual stress is basically generated on the bending outside with respect to a neutral axis of bending. For stretch bend forming, since tensile stress increases in the axial direction of the extrusion, a position of the neutral axis moves to the bending inside, and thus a peak position of tensile residual stress approaches a position of the neutral axis in an initial stage (before bend forming). When tensile stress is especially large, the peak position moves to the bending inside beyond the position of the initial neutral axis.

The tensile residual stress generated in the aluminum alloy extrusion due to stretch bend forming causes stress corrosion cracking under corrosive environment. In typical aluminum alloys, stress corrosion cracking is more likely to occur with higher strength.

Known aluminum alloy extrusions having hollow sections include one including a pair of flanges and a pair of webs connecting the flanges, and one including the pair of flanges, the pair of webs, and one or more middle rib. The middle rib is located between the webs and connects the flanges together. Such an aluminum alloy extrusion is typically manufactured by porthole extrusion.

As well known, the porthole extrusion is performed using a porthole dice including a combination of a mandrel body having a plurality of portholes and a dice. An aluminum billet is pushed into the porthole dice and divided through the portholes, and then the divided pieces are reintegrated by welding while surrounding the mandrel. The inside and the outside of such a reintegrated object are shaped by the mandrel and the dice, respectively, so that the extrusion having the hollow section is formed.

Japanese Unexamined Patent Application Publication Nos. Hei7 (1995)-227618 (Patent Literature 1), Hei8 (1996)-170139 (Patent Literature 2), Hei10 (1998)-306338 (Patent Literature 3), 2001-71025 (Patent Literature 4), 2016-112603 (Patent Literature 5), and Japanese Patent No. 6322329 (Patent Literature 6), and JP 2004-149907 (Patent Literature 7) each disclose an aluminum alloy extrusion having a hollow section, in particular, a position of a weld in a cross section perpendicular to an extrusion direction. According to such Patent Literatures 1 to 6, an aluminum alloy extrusion including a pair of flanges and a pair of webs has welds formed in four corner portions (Patent Literatures 1, 2, 4, and 5), or formed in the pair of flanges or/and the pair of webs (Patent Literatures 1, 3, and 6). According to Patent Literature 1, an aluminum alloy extrusion includes a pair of flanges, a pair of webs, and one middle rib, in which welds are formed at four corner portions and the middle rib, or at the pair of flanges, the pair of webs, and the middle rib.

As well known, a microstructure is different and thus a mechanical property is different between a weld and any other portion (normal portion) of the aluminum alloy extrusion (see Patent Literature 2). Specifically, the weld has a lower fracture limit than the normal portion, which disadvantageously causes a reduction in strength of the aluminum alloy extrusion as a structural member. Further, grains of aluminum alloy are more coarsened and thus stress corrosion cracking disadvantageously tends to occur in the weld than in the normal portion (see Patent Literature 7).

SUMMARY

An aluminum alloy extrusion 1 illustrated in FIG. 4 includes a pair of flanges 2 and 3, a pair of webs 4 and 5, and a middle rib 6. When the aluminum alloy extrusion 1 is subjected to bend forming with a bending axis being a direction perpendicular to a longitudinal direction (extrusion direction) and parallel to the flanges 2 and 3, residual stress is generated in the webs 4 and 5 and the middle rib 6 of the aluminum alloy extrusion 1 subjected to bend forming, and distribution of the residual stress has a shape shown by a graph of FIG. 4, for example. A position (peak position p of tensile residual stress) at which tensile residual stress becomes the maximum exists at some position in a region (an area shown by a double-headed arrow in FIG. 4) between a neutral axis n of bending and an outer bending end, and the position varies depending on the degree of bending.

When the aluminum alloy extrusion 1 is subjected to stretch bend forming (bend forming with tension in the longitudinal direction) as the bend forming, the peak position p moves to the bending inside, and distribution of the residual stress has a shape shown by a graph of FIG. 5, for example. In case of the stretch bend forming, the peak position p of tensile residual stress exists at some position in the entire region (an area shown by a double-headed arrow in FIG. 5) between the inner bending end and the outer bending end, and the position varies depending on the degree of bending and magnitude of tension applied to the aluminum alloy extrusion 1.

When the web 4, the web 5, or/and the middle rib 6 of the aluminum alloy extrusion 1 has a weld, the peak position p may overlap a position of the weld depending on the degree of bending and magnitude of the applied tension in the aluminum alloy extrusion 1 subjected to bend forming. If high tensile residual stress is generated in the weld of the aluminum alloy extrusion 1 subjected to bend forming, stress corrosion cracking may occur in the weld at a high possibility.

As a measure for suppressing occurrence of stress corrosion cracking, heat treatment has been industrially performed on the aluminum alloy extrusion subjected to bend forming to reduce the tensile residual stress. As another measure for suppressing occurrence of stress corrosion cracking, there has been provided an aluminum alloy extrusion having a specific alloy composition and a specific microstructure (see Patent Literature 7).

On the other hand, it has not been considered to suppress occurrence of stress corrosion cracking through improvement in structure including a weld of an aluminum alloy extrusion.

The present invention, which is made from a nontraditional viewpoint (improvement in structure including a weld), is intended to suppress stress corrosion cracking, which tends to occur in a weld after bend forming, in an aluminum alloy component produced by bend forming of an aluminum alloy extrusion having a hollow section.

The invention provides an aluminum alloy component including an aluminum alloy extrusion that includes a pair of flanges, a pair of webs connecting the flanges together, and a weld on each of the webs and has been subjected to bend forming with a bending axis being a direction perpendicular to a longitudinal direction and parallel to the flanges, where tensile residual stress exists in the web and a peak position of the tensile residual stress exists in a region other than the vicinity of the weld. The invention further provides an aluminum alloy component including the aluminum alloy extrusion that includes the pair of flanges, the pair of webs, and a middle rib, and has a weld on at least one of the webs and the middle rib, where tensile residual stress exists in each of the webs and the middle rib, and a peak position of the tensile residual stress exists in a region other than the vicinity of the weld.

In the aluminum alloy component according to the invention, the weld on the web or/and the middle rib is formed at a position away from the peak position of tensile residual stress. Tensile residual stress in the weld is therefore lower than the peak value (the maximum), making it possible to correspondingly suppress occurrence of stress corrosion cracking in the weld on the web or/and the middle rib.

DETAILED DESCRIPTION

Hereinafter, the aluminum alloy component according to the invention is specifically described with reference to FIGS. 1 to 3C.

Figure 1:
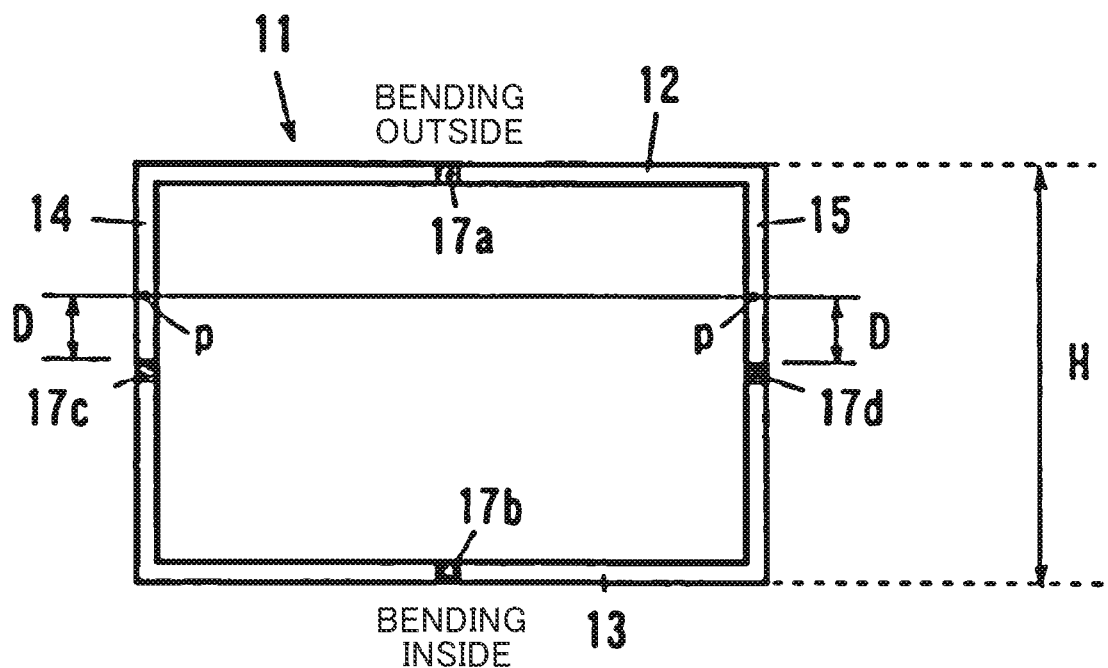
FIG. 1 is a view for explaining a relationship between a weld on a web and a peak position of tensile residual stress existing in the web in an aluminum alloy component (aluminum alloy extrusion subjected to bend forming) according to the invention.

An aluminum alloy extrusion 11 illustrated in FIG. 1 includes a pair of flanges 12 and 13 and a pair of webs 14 and 15 connecting the flanges 12 and 13 together, and has welds 17a to 17d on the flanges 12 and 13 and the webs 14 and 15. The flanges 12 and 13 are parallel to each other, and the webs 14 and 15 are perpendicular to the flanges 12 and 13.

Figure 4:
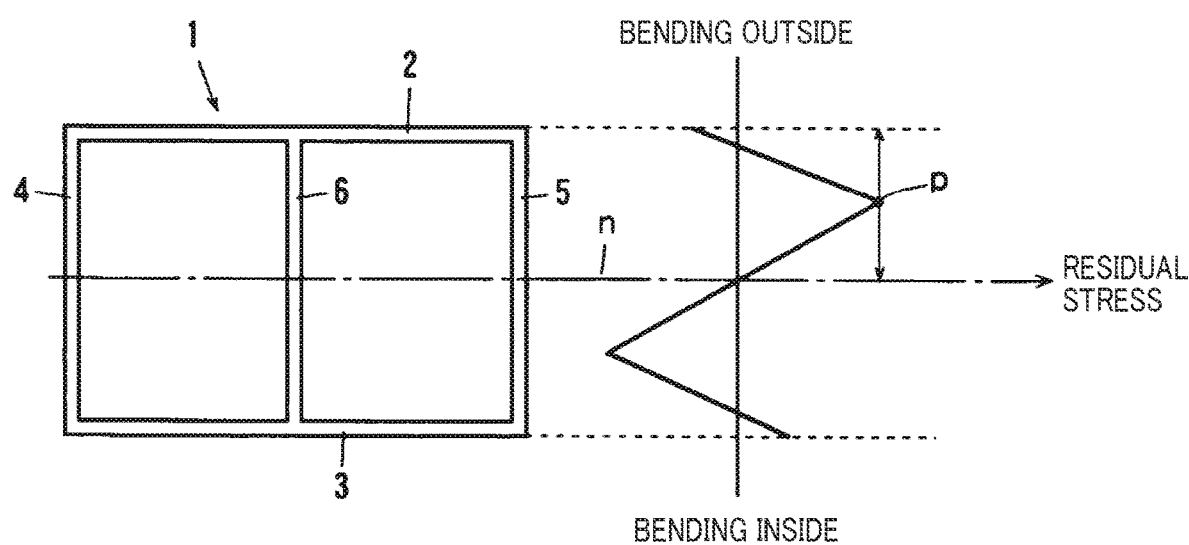
FIG. 4 exemplarily illustrates distribution of residual stress generated in the aluminum alloy extrusion that has just been subjected to simple bend forming.
Figure 5:
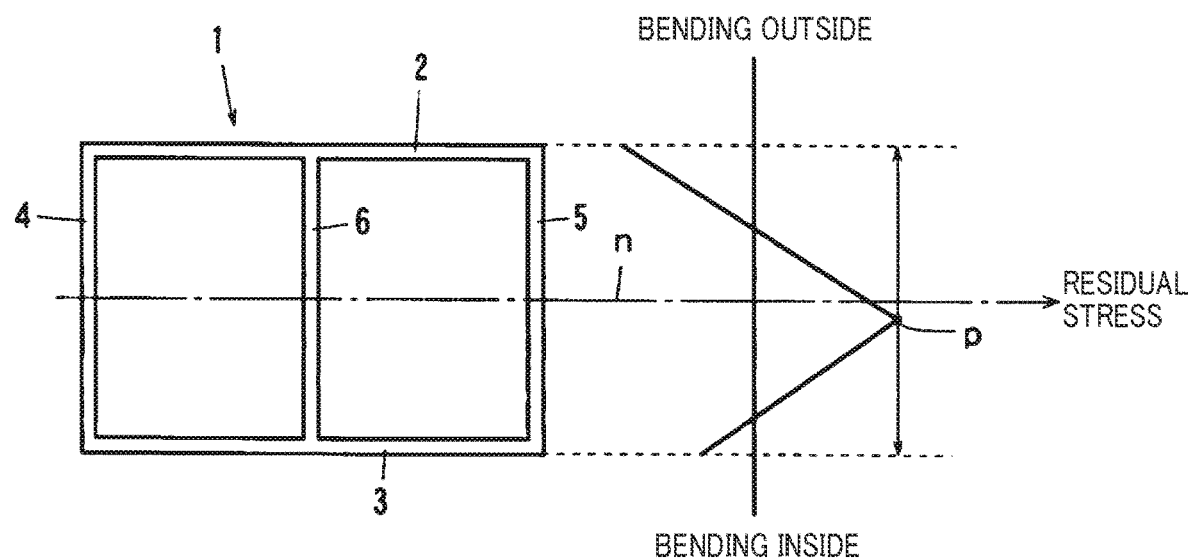
FIG. 5 exemplarily illustrates distribution of residual stress generated in the aluminum alloy extrusion that has just been subjected to stretch bend forming.

When the aluminum alloy extrusion 11 is subjected to bend forming with a bending axis being a direction perpendicular to a longitudinal direction (extrusion direction) and parallel to the flanges 12 and 13, residual stress is generated along the longitudinal direction (extrusion direction) in each of the webs 14 and 15 of the aluminum alloy extrusion 11 that has just been subjected to bend forming (aluminum alloy component). When simple bending, in which no tension is applied in the longitudinal direction, is performed as the bend forming, as shown in FIG. 4, a peak position p of tensile residual stress is some position in a region between a neutral axis n of bending and an outer bending end, and that position varies depending on the degree of bending. When the bend forming is stretch bend forming, in which tension is applied in the longitudinal direction, as shown in FIG. 5, the peak position p moves to a more inner side of bending than in simple bending, and that position varies depending on the degree of bending and/or tension. Distribution of residual stress generated in the webs 14 and 15 after bend forming can be determined using a known measurement method such as an X-ray diffraction method and a strain gauge method.

In the aluminum alloy extrusion 11 subjected to bend forming (aluminum alloy component of the invention), the peak positions p of tensile residual stress on the webs 14 and 15 exist in regions other than the vicinities of the welds 17c and 17d, respectively. In the invention, as shown in FIG. 1, the vicinities of the welds 17c and 17d each mean a region roughly satisfying D<H/10, where H is height (distance from an outer bending end to an inner bending end) of the aluminum alloy component, and D is a distance from the weld 17c or 17d to the peak position p. This region includes a position (D=0) of the weld 17c or 17d itself. The region other than the vicinity of the weld 17c or 17d means a region roughly satisfying D≥H/10.

In bend forming of the aluminum alloy extrusion 11, fixing the degree of bending and tension makes it possible to experimentally predict a position on the web 14 or 15 to be occupied by the peak position p. In extrusion of the aluminum alloy extrusion 11, formation positions of the welds 17c and 17d are determined by a structure of a porthole dice. Hence, when the degree of bending and tension are fixed, through appropriate dice design, it is possible to form each of the welds 17c and 17d in the region satisfying D≥H/10, locate the peak position p of tensile residual stress generated in the aluminum alloy component (aluminum alloy extrusion 11 subjected to bend forming) in a region other than on the weld 17c or 17d and away from the weld 17c or 17d by the distance D (≥H/10). This reduces tensile residual stress in the weld 17c or 17d of the aluminum alloy component and makes it possible to correspondingly suppress occurrence of stress corrosion cracking.

Figure 2:
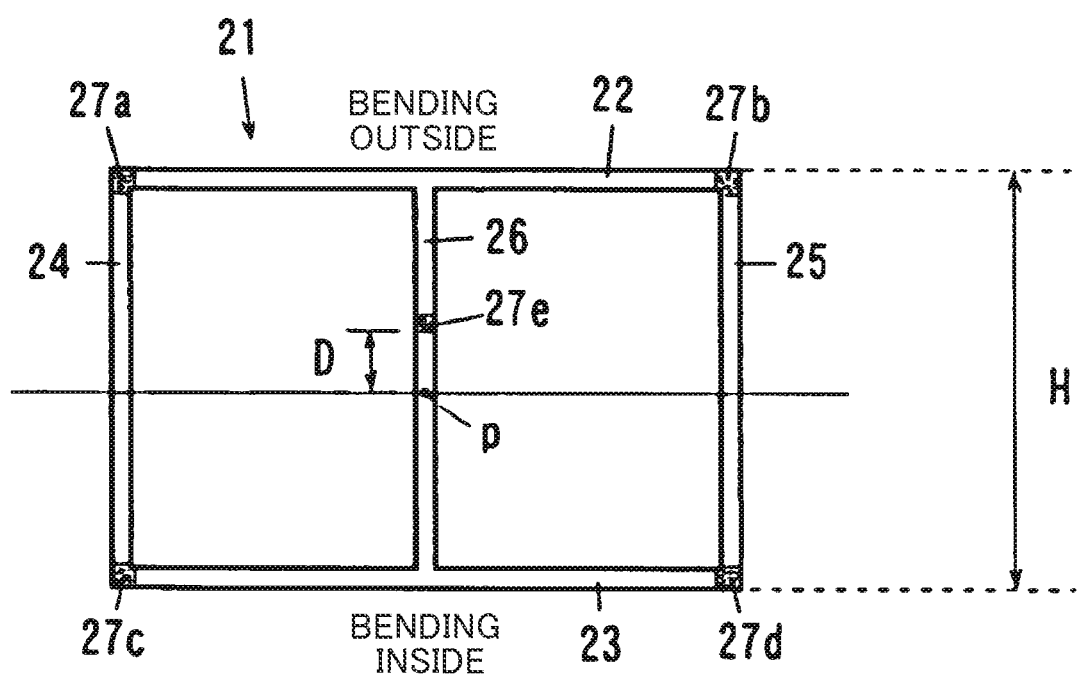
FIG. 2 is a view for explaining a relationship between a weld on a middle rib and a peak position of tensile residual stress existing in the middle rib in another aluminum alloy component (aluminum alloy extrusion subjected to bend forming) of the invention.

An aluminum alloy extrusion 21 illustrated in FIG. 2 includes a pair of flanges 22 and 23, a pair of webs 24 and 25, and one middle rib 26 between the webs 24 and 25, and has welds 27a to 27e on the four corners and the middle rib 26. The flanges 22 and 23 are parallel to each other, and the web 24, the web 25, and the middle rib 26 are perpendicular to the flanges 22 and 23.

When the aluminum alloy extrusion 21 is subjected to bend forming with a bending axis being a direction perpendicular to a longitudinal direction (extrusion direction) and parallel to the flanges 22 and 23, residual stress is generated along the longitudinal direction in each of the web 24, the web 25, and the middle rib 26 of the aluminum alloy extrusion 21 that has just been subjected to bend forming (aluminum alloy component). When simple bending is performed as the bend forming, as shown in FIG. 4, the peak position p of tensile residual stress is some position in a region between the neutral axis n of bending and the outer bending end, and that position varies depending on the degree of bending. When the bend forming is stretch bend forming, as shown in FIG. 5, the peak position p moves to a more inner side of bending than in simple bending, and that position varies depending on the degree of bending and/or tension. Residual stress generated in the middle rib 26 after bend forming can be determined using a known measurement method such as an X-ray diffraction method and a strain gauge method.

In the aluminum alloy extrusion 21 subjected to bend forming (aluminum alloy component of the invention), the peak position p of tensile residual stress on the middle rib 26 exists in a region other than the vicinity of the weld 27e. In the invention, as shown in FIG. 2, the vicinity of the weld 27e means a region roughly satisfying D<H/10, where H is height (distance from an outer bending end to an inner bending end) of the aluminum alloy component, and D is a distance from the weld 27e to the peak position p. This region includes a position (D=0) of the weld 27e itself. The region other than the vicinity of the weld 27e means a region roughly satisfying D≥H/10.

In bend forming of the aluminum alloy extrusion 21, fixing the degree of bending and tension makes it possible to experimentally predict a place on the middle rib 26 to be occupied by the peak position p. In extrusion of the aluminum alloy extrusion 21, a formation position of the weld 27e is determined by a structure of a porthole dice. Hence, when the degree of bending and tension are fixed, appropriate dice design makes it possible to form the weld 27e at a position satisfying D≥H/10, locate the peak position p of tensile residual stress generated in the aluminum alloy component (aluminum alloy extrusion 21 subjected to bend forming) in a region other than on the weld 27e and away from the weld 27e by the distance D (≥H/10). This reduces tensile residual stress in the weld 27e of the aluminum alloy component and makes it possible to correspondingly suppress occurrence of stress corrosion cracking.

Figure 3A:
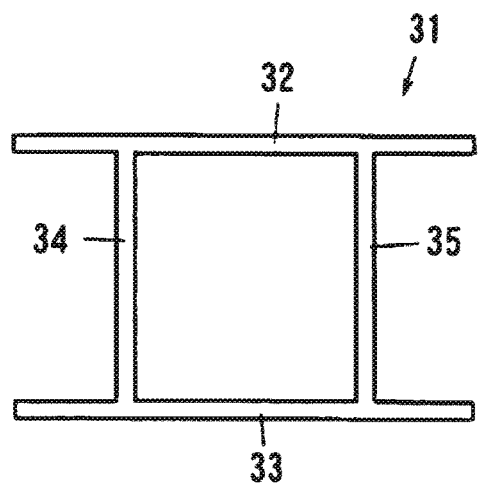
FIGS. 3A to 3C are each another exemplary sectional view of the aluminum alloy component.
Figure 3B:
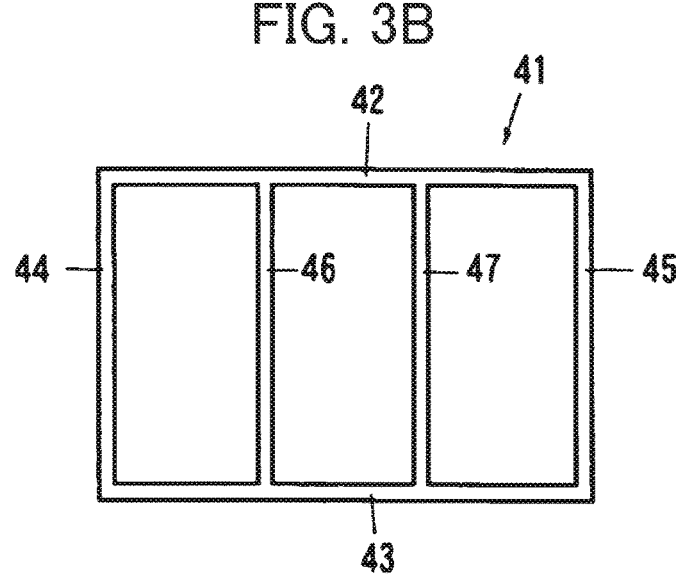
Figure 3C:
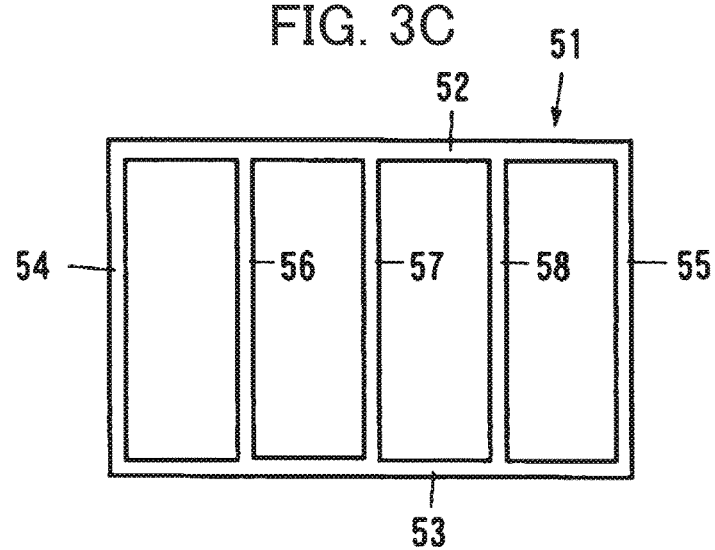

FIGS. 3A to 3C are each another exemplary sectional shape of an aluminum alloy extrusion as a material of the aluminum alloy component according to the invention.

An aluminum alloy extrusion 31 illustrated in FIG. 3A includes a pair of flanges 32 and 33 and a pair of webs 34 and 35, in which each of the flanges 32 and 33 has projecting flanges (portions projecting outward from the webs 34 and 35) on two horizontal sides.

An aluminum alloy extrusion 41 illustrated in FIG. 3B includes a pair of flanges 42 and 43, a pair of webs 44 and 45, and two middle ribs 46 and 47.

An aluminum alloy extrusion 51 illustrated in FIG. 3C includes a pair of flanges 52 and 53, a pair of webs 54 and 55, and three middle ribs 56 to 58.

When such aluminum alloy extrusions 31, 41, and 51 are each subjected to bend forming with a bending axis being a direction perpendicular to a longitudinal direction and parallel to the flanges, a weld on each web or/and the middle rib is beforehand formed at a position satisfying D≥H/10, making it possible to suppress occurrence of stress corrosion cracking.

A high-strength 7000-series aluminum alloy extrusion, in which stress corrosion cracking tends to occur, can be preferably, but not limitedly, used as the aluminum alloy extrusion as a material of the aluminum alloy component of the invention. A composition defined in JIS or the AA standard can be used as a composition of the 7000-series aluminum alloy. A preferred composition may contain, in percent by mass, Zn: 3 to 8, Mg: 0.4 to 2.5, Cu: 0.05 to 2.0, Ti: 0.005 to 0.2, and at least one of Mn: 0.01 to 0.5, Cr: 0.01 to 0.3, and Zr: 0.01 to 0.3, with the remainder consisting of Al and impurities.

This application claims the benefits of priority to Japanese Patent Application No. 2019-037663, filed Mar. 1, 2019. The entire contents of the above application are herein incorporated by reference.

What is claimed is:

1. An aluminum alloy component, comprising an aluminum alloy extrusion including a pair of flanges, a pair of webs connecting the flanges together, and a respective weld on each of the webs, the aluminum alloy component being subjected to bend forming with a bending axis being a direction perpendicular to a longitudinal direction and parallel to the flanges,
wherein tensile residual stress exists in the webs and respective welds are formed in an extrusion process that forms the aluminum alloy extrusion, wherein formation positions of the respective welds in the extrusion process are configured such that a peak position of the tensile residual stress exists in a region other than the vicinity of the respective welds.

2. The aluminum alloy component according to claim 1, wherein the bend forming is stretch bend forming.

3. The aluminum alloy component according to claim 1, wherein the pair of webs each connects the pair of flanges together.

4. The aluminum alloy component according to claim 1, wherein the peak position of the tensile residual stress is predicted so that the formation positions of the one or more welds are determined before the extrusion process.

5. An aluminum alloy component, comprising an aluminum alloy extrusion that includes a pair of flanges, a pair of webs connecting the flanges together, and one or more middle ribs located between the webs and connecting the flanges together, and has one or more welds on at least one of the webs or the middle rib, the aluminum alloy component being subjected to bend forming with a bending axis being a direction perpendicular to a longitudinal direction and parallel to the pair of flanges,
wherein tensile residual stress exists in the webs and the middle rib, and the one or more welds are formed in an extrusion process that forms the aluminum alloy extrusion, wherein formation positions of the one or more welds in the extrusion process are configured such that a peak position of the tensile residual stress exists in a region other than the vicinity of the one or more welds.

6. The aluminum alloy component according to claim 5, wherein the bend forming is stretch bend forming.

7. The aluminum alloy component according to claim 5, wherein the pair of webs each connects the pair of flanges together.

8. The aluminum alloy component according to claim 5, wherein the one or more middle ribs each connect the pair of flanges together.

9. The aluminum alloy component according to claim 5, wherein the peak position of the tensile residual stress is predicted so that the formation positions of the one or more welds are determined before the extrusion process.

* * * * *